United States Patent
Boozer et al.

(10) Patent No.: US 7,753,223 B2
(45) Date of Patent: Jul. 13, 2010

(54) INTERLOCKING BLENDER CONTAINER, COVER AND COVER PLUG

(75) Inventors: Richard D. Boozer, Wakeman, OH (US); Robert M. Ulanski, Broadview Heights, OH (US); Michael D. Anton, Olmsted Township, OH (US); Jonathan M. Katz, Solon, OH (US)

(73) Assignee: Vita-Mix Corporation, Cleveland, OH (US)

( * ) Notice: Subject to any disclaimer, the term of this patent is extended or adjusted under 35 U.S.C. 154(b) by 1353 days.

(21) Appl. No.: 11/131,512

(22) Filed: May 17, 2005

(65) Prior Publication Data

US 2006/0261066 A1    Nov. 23, 2006

(51) Int. Cl.
B65D 51/18 (2006.01)
B65D 41/16 (2006.01)

(52) U.S. Cl. ............... 220/254.7; 220/784; 220/256.1; D7/378

(58) Field of Classification Search ............. 220/254.7, 220/784, 256.1, 324, 254.1, 255.1, 796, 254.4, 220/791, 793, 801, 805, 296, 298, 300, 301, 220/802, 798, 254.8, 657, 297; D7/378; 99/348
See application file for complete search history.

(56) References Cited

U.S. PATENT DOCUMENTS 4,087,053 A * 5/1978 Voglesonger ............ 241/282.1
5,225,078 A * 7/1993 Polasky et al. ............. 210/264
D339,715 S * 9/1993 Barrault ..................... D7/378
5,275,307 A   1/1994 Freese ......................... 222/42

(Continued)

FOREIGN PATENT DOCUMENTS

FR    2696087    4/1994
GB     699947   11/1953

OTHER PUBLICATIONS

Drawings of a prior art system sold by Vita-Mix Corporation, Cleveland, Ohio, 3 pages (2005).

(Continued)

*Primary Examiner*—Robin Hylton
(74) *Attorney, Agent, or Firm*—Renner, Kenner, Greiva, Bobak, Taylor & Weber (57) ABSTRACT

A system (10) for attaching a cover (12) to a container (11) and for closing an opening (21) in the cover (12) with a plug (13) utilizes a container (11) having an upper lip (16). The cover (12) is made of an elastomeric material and has handles (30) each having a notch (31) therein to receive the lip (16) of the container (11). A ridge (32) depends from the periphery of the opening (21) in the cover (12). The ridge (32) is generally square having sides (33) and corners (34). The ridge (33) includes a notch (35) formed in each side (33), and ribs (36) are positioned at each side of the notches (35). The plug (13) has a generally cylindrical stem (41) whose diameter approximates the length of a side (33) of the ridge (32). Diametrically opposed tabs (45) are positioned on the stem (41). By aligning the tabs (45) with the corners (34) of the ridge (32), the stem (41) can pass through the opening (21). Then rotating the plug (13) allows the tabs (45) to pass over the ribs (36) and into opposed notches (35).

23 Claims, 7 Drawing Sheets

U.S. PATENT DOCUMENTS

| | | | | |
|---|---|---|---|---|
| 5,634,566 | A | * | 6/1997 | Jansen et al. .............. 220/254.8 |
| 5,641,065 | A | * | 6/1997 | Owens et al. ................ 206/370 |
| 5,678,718 | A | | 10/1997 | Morris et al. ................ 220/254 |
| 6,793,096 | B1 | * | 9/2004 | Seok ........................... 220/788 |
| D526,839 | S | * | 8/2006 | Boozer et al. ................ D7/392 |
| 2005/0279746 | A1 | * | 12/2005 | Hsu ............................ 220/234 |

OTHER PUBLICATIONS

International Search Report for PCT/US06/16390.

Written Opinion of International Searching Authority for PCT/US06/16390.

* cited by examiner

INTERLOCKING BLENDER CONTAINER, COVER AND COVER PLUG

TECHNICAL FIELD

This invention relates to a system of attaching a lid to a container, such as the pitcher of a blender, and of attaching a plug in an opening in the lid of the container.

BACKGROUND ART

A typical blender or food processor includes a container, often in the form of a pitcher having a handle and a spout, into which food items to be blended or mixed are placed. Then a cover or lid is positioned on the container so that the contents thereof cannot escape during the blending process. That process includes the high speed rotation of a blade or blades positioned near the bottom of the container which induces a circulation of the contents of the container. Such action often creates a pressure build-up within the container, particularly if the container is quite full, which can blow the lid off the container and allow the contents thereof to escape. Such can present a safety problem, particularly if the contents of the container are hot.

In addition, many lids for blender containers are provided with a central opening so that additional food items can be added to the container as may be necessary during the blending process. This opening also allows the user to manually agitate or mix the contents of the container during the blending process should that be necessary. When access to the contents of the container is not necessary, typically a plug is inserted into the central opening to seal the container. However, these plugs are normally maintained in the opening only by a friction fit, and in the circumstances of pressure build-up previously described, the plugs can easily blow out of the lid even if the lid remains on the container, resulting in the potential escape of the contents from the container.

The need exists, therefore, for a system which securely attaches a lid to the container of a blender and securely attaches a plug to a lid having an opening therein.

DISCLOSURE OF THE INVENTION

Thus, it is an object of one aspect of the present invention to provide a system for attaching a lid to a container.

It is another object of the present invention to provide a system, as above, wherein the lid is readily and easily removable from the container.

In accordance with another aspect of the present invention, it is an additional object to provide a system for securely attaching a plug in an opening in a lid for the container for a blender.

These and other objects of the present invention, as well as the advantages thereof over existing prior art forms, which will become apparent from the description to follow, are accomplished by the improvements hereinafter described and claimed.

In general, in accordance with one aspect of the present invention, the combination of a cover having an opening and a plug to close the opening is contemplated. The plug includes a stem having opposed tabs extending therefrom. The cover is made of an elastomeric material and has a ridge depending from the periphery of the opening. The ridge includes at least one notch with a rib positioned on each side of the notch. The relative dimensions of the stem and the opening are such that at some relative positions between the stem and the opening the stem can pass through the opening so that each of the tabs can pass over a rib and be received in a notch.

In accordance with another aspect of the present invention, the combination of a container and a cover is contemplated. The container has sidewalls and a lip extending from the sidewalls. The cover is made of an elastomeric material and has at least one handle. The handle has a notch therein to engage the lip of the container. The cover is removable from the container by lifting the handle to remove the lip from the notch.

A container system in accordance with the present invention includes a pitcher having an upper lip, an elastomeric cover having an opening therein, and a plug to close the opening. The cover has at least one handle with a notch therein to engage the lip of the pitcher. A ridge depends from the periphery of the opening in the cover and includes at least one notch and a rib positioned on each side of the notch. The plug has a stem with opposed tabs extending therefrom. The relative dimensions of the stem and the opening are such that at some relative positions between the stem and the opening the stem can pass through the opening such that each of the tabs can pass over a rib and be received in a notch of the ridge.

A preferred exemplary lid and plug system for a container according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

A container, generally indicated by the numeral 11, a cover, generally indicated by the numeral 12, and a plug, generally indicated by the numeral 13, make up the system of the present invention generally indicated by the numeral 10. Container, cover and plug system 10 is particularly designed for, and useful with, a blender wherein food products are mixed in container 11 by a rotating blade (not shown). However, the present invention could also find usefulness in other environments.

Container 11 can be a conventional blender pitcher and includes a bottom wall 14 with one or more sidewalls 15 extending upwardly therefrom and terminating at an upper open circular end. An upper lip 16 extends outwardly from the upper end of sidewalls 15. In addition, lip 16 may be interrupted to form a pouring spout 17, and a handle 18 may be formed diametrically opposed to spout 17 so that container 11 can be lifted by handle 18, and the contents thereof conveniently discharged through spout 17. Container 11 is preferably made of a durable and readily cleanable polycarbonate material.

Figure 7:
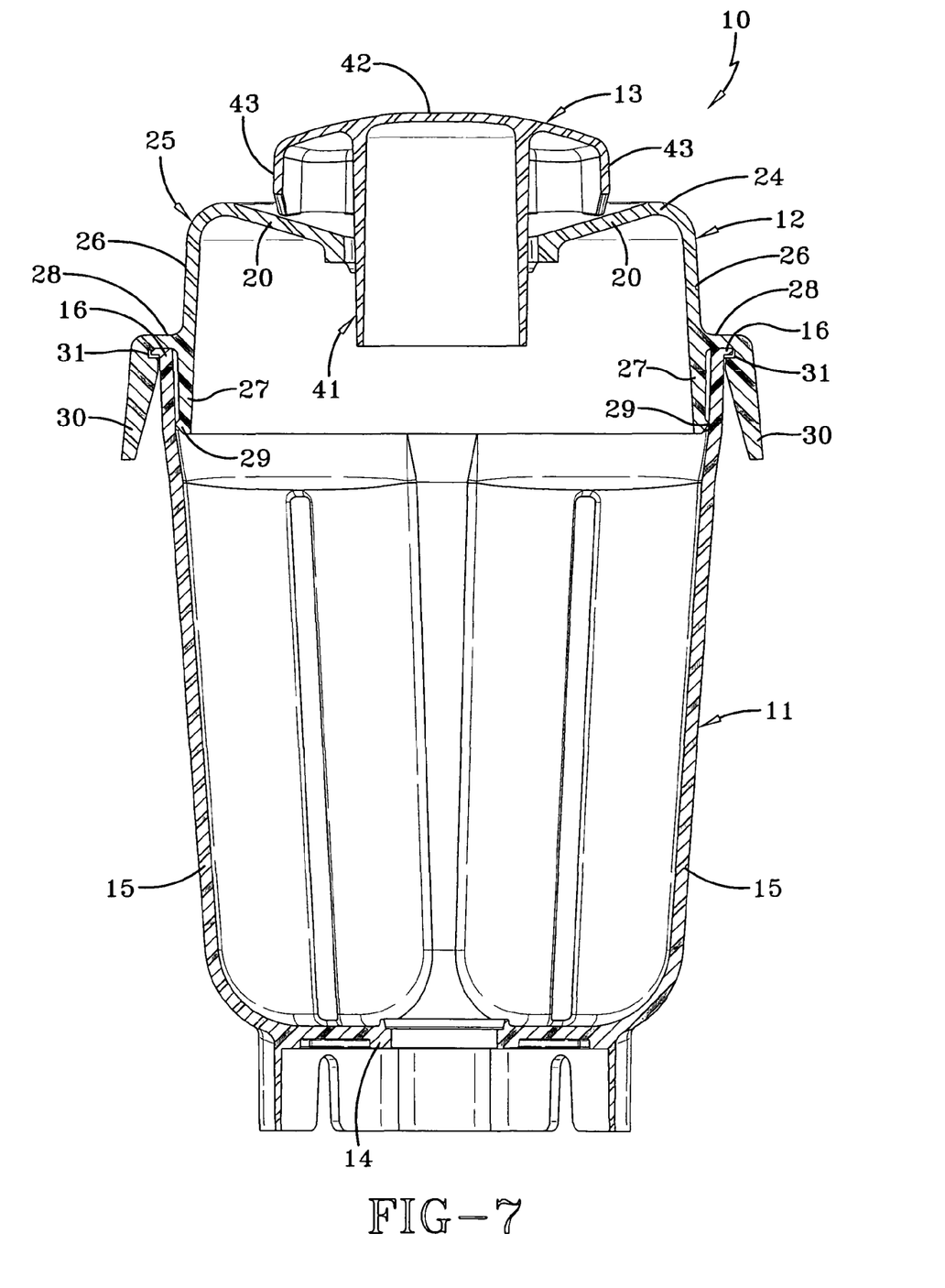
FIG. 7 is a sectional view taken substantially along line 7-7 of FIG. 6 showing the lid and plug in an unlocked position and showing the manner in which the lid engages and seals the container.
Figure 8:
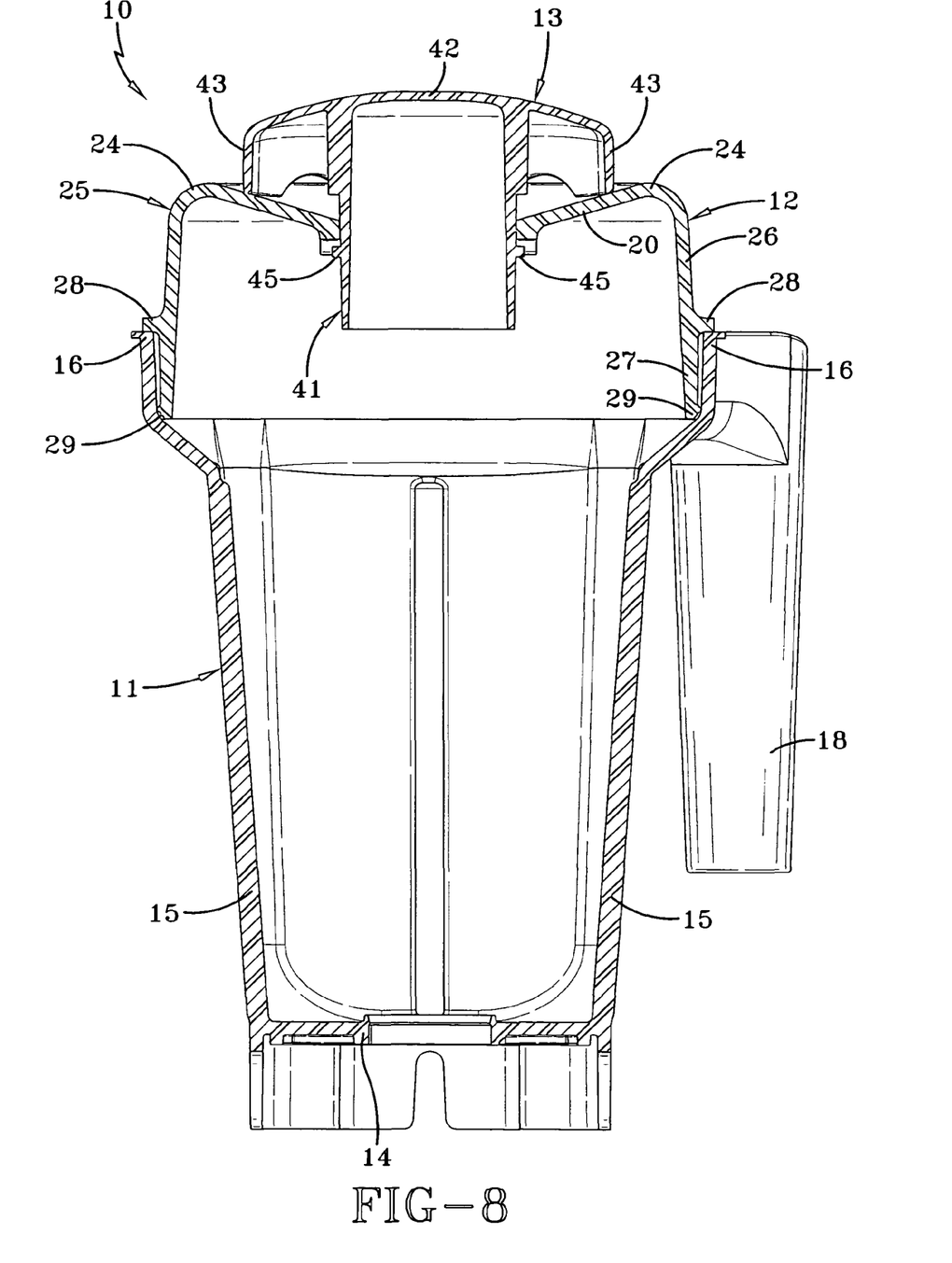
FIG. 8 is a sectional view taken substantially along line 8-8 of FIG. 6 showing the lid and plug in a locked position.

Cover 12 includes a generally circular dished-out top surface 20 having a generally centrally located aperture, generally indicated by the numeral 21, therein. As shown, aperture 21 is basically rectangular or square in nature having four sides 22 and rounded corners 23. A radiused surface 24 joins a generally cylindrical skirt 25 to the periphery of top surface 20. Skirt 25 thus extends downwardly from top surface 24 and is divided into an upper skirt portion 26 and a lower skirt portion 27 by a circular rim 28 which extends radially outwardly from skirt 25. A small sealing rib 29 is preferably provided on the outside of the lower end of lower skirt portion 27. Rim 28 carries diametrically opposed handles or flaps 30 which extend downwardly from rim 28. A notch 31 is formed near the top of each handle 30 to receive lip 16 of container 11 as shown in FIG. 7. As best shown in FIG. 8, rim 29 otherwise rests on the top of lip 16.

Cover 12 is formed of a resilient or elastomeric material such as most known thermoplastic elastomers (TPE's). Such TPE's include, for example, thermoplastic olefin rubbers, thermoplastic vulcanizates, and thermoplastic elastic block copolymers. These materials are particularly suited for cover 12 as they all exhibit the elastomeric properties required for cover 12.

As a result, cover 12 is easily attachable to, and detachable from, container 11 in view of the flexible nature thereof. That is, to position cover 12 on container 11, all one needs to do is to push cover 12 downwardly. Such action positions lower skirt portion 27 within container 11, and flexes handles 30 outwardly until container lip 16 is positioned in notch 31, at which time the handles flex back into the normal position shown in FIG. 7. Rib 29 provides a seal for the container. A simple flexing outward of one of the handles 30 dislocates lip 16 from notch 31, and cover 12 can thereby be easily removed from container 11.

Figure 1:
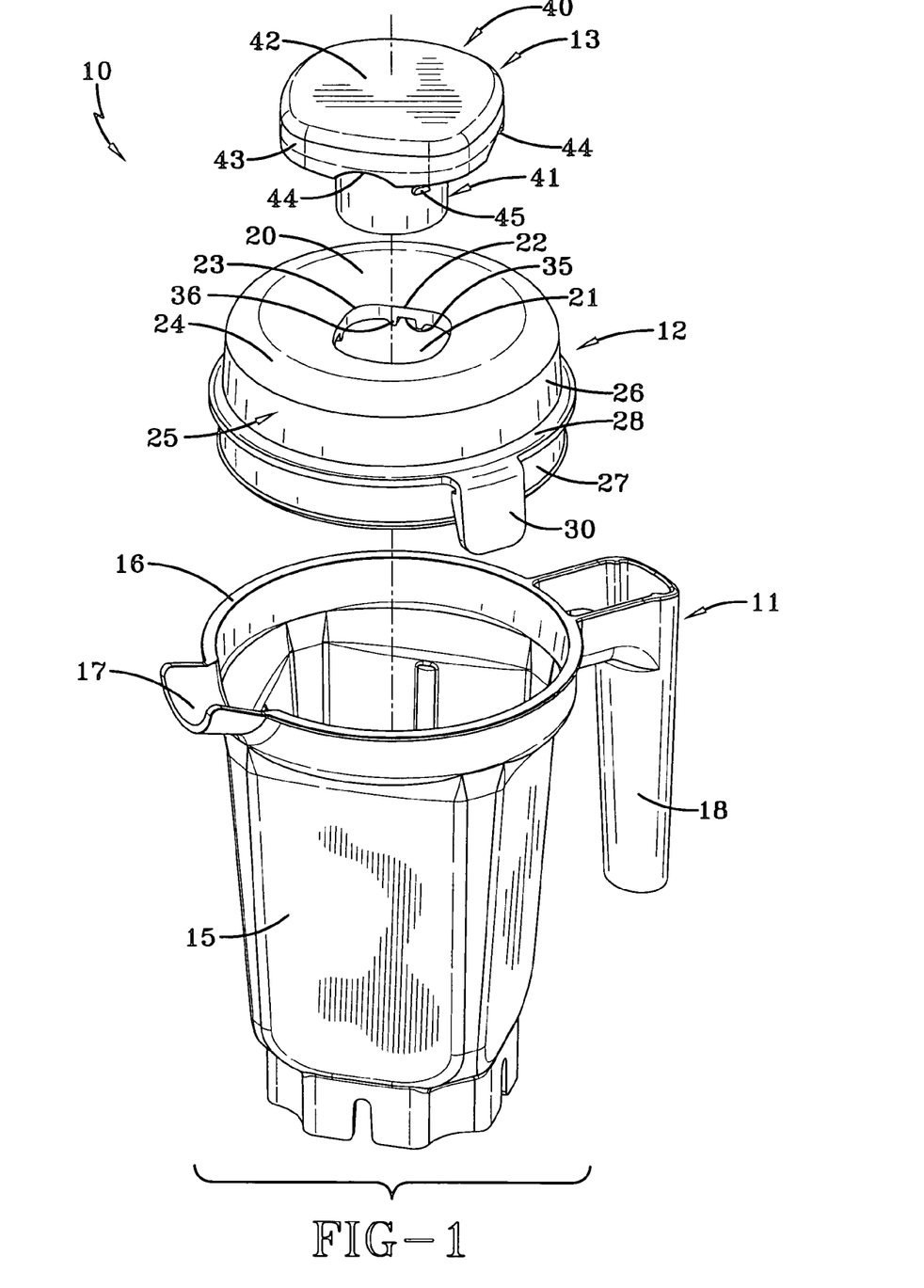
FIG. 1 is an exploded, perspective view of a container, lid and plug system made in accordance with the present invention.
Figure 2:
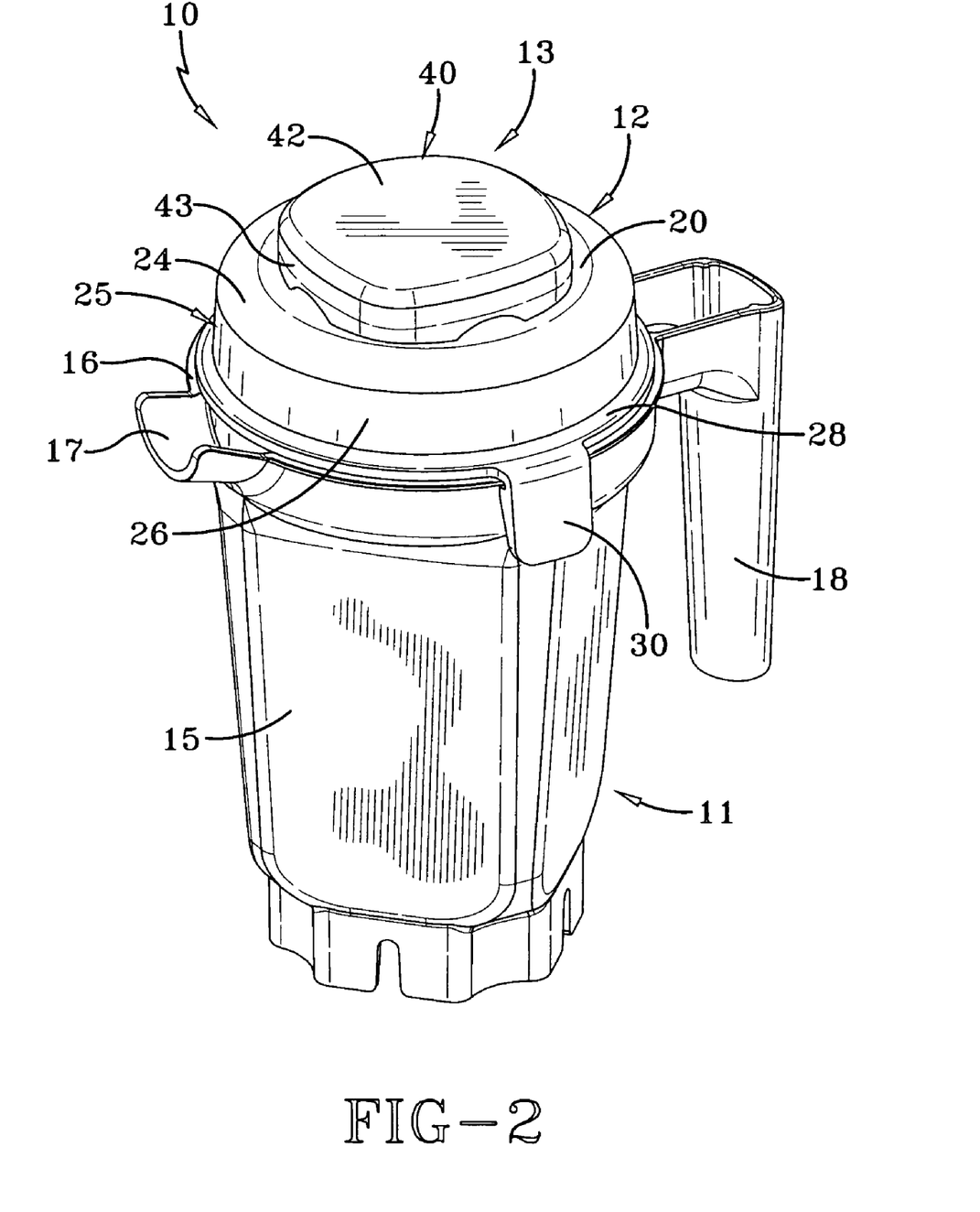
FIG. 2 is a perspective view of the components of FIG. 1 assembled.
Figure 3:
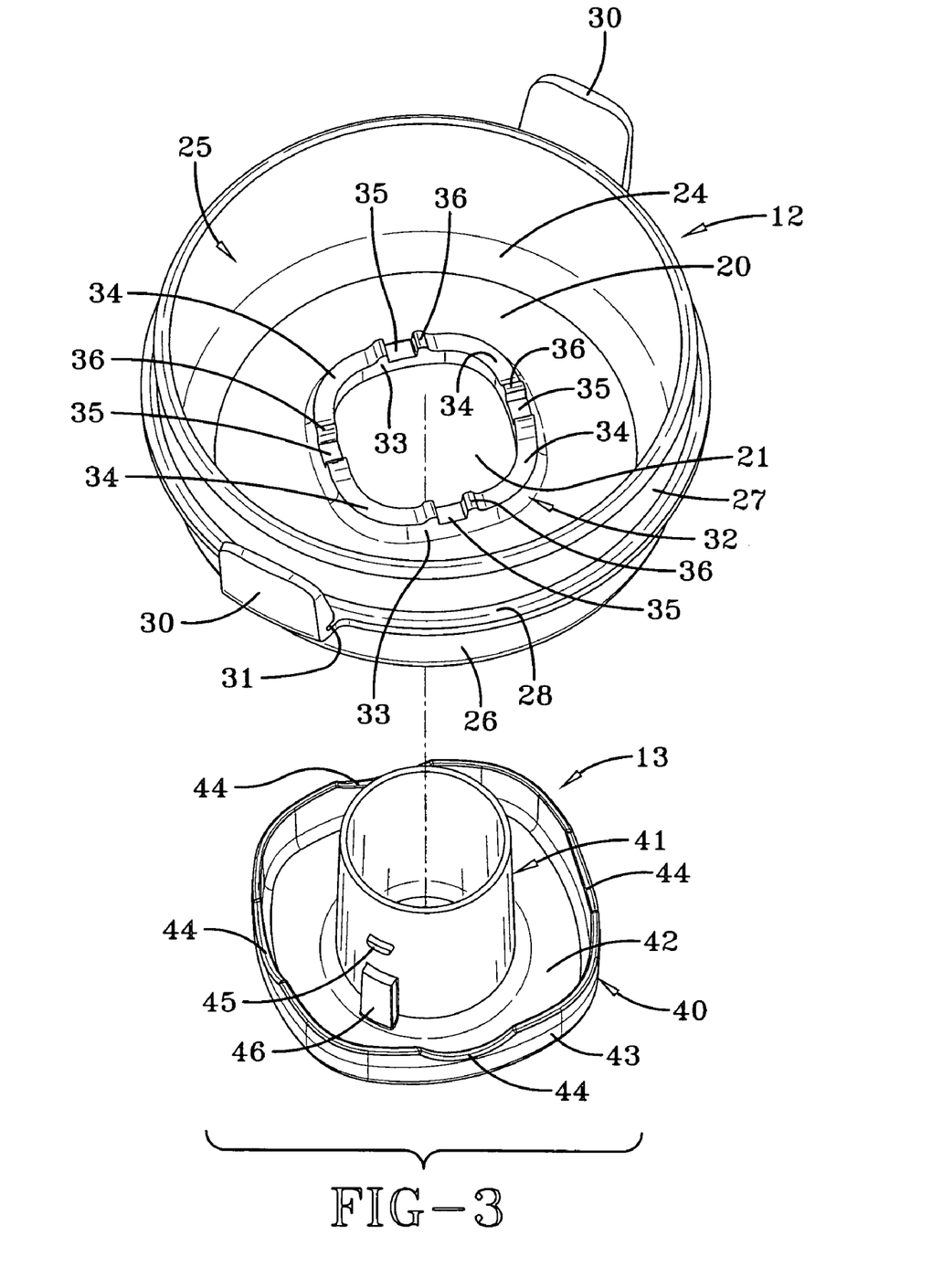
FIG. 3 is an exploded, bottom, perspective view of the lid and plug components of the system of the present invention.
Figure 4:
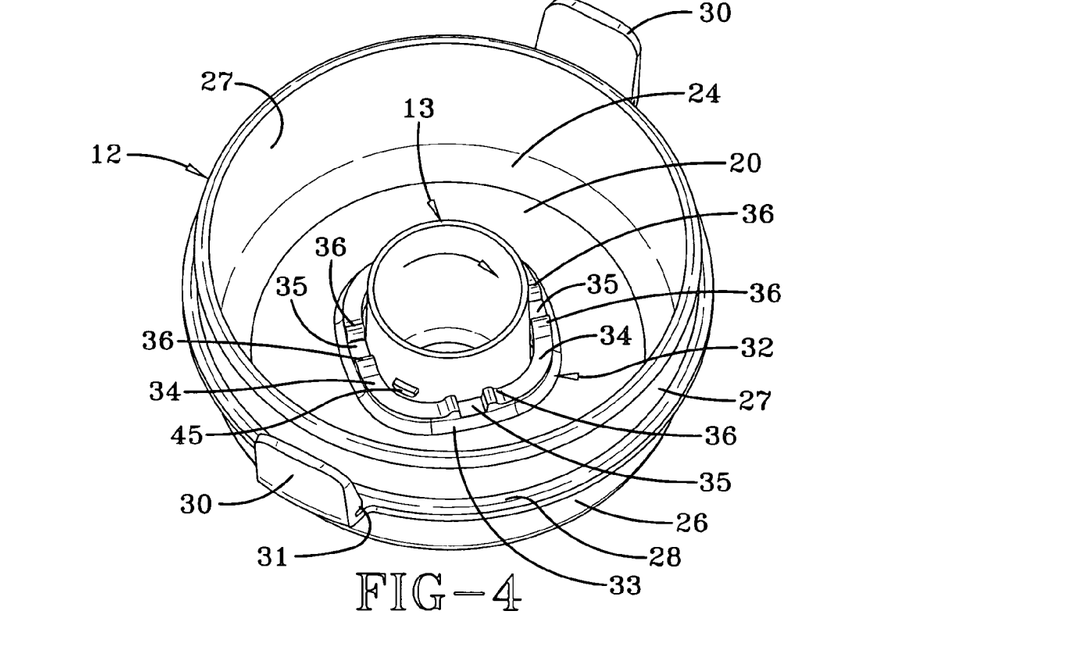
FIG. 4 is a bottom perspective view of the lid and plug components assembled in an unlocked position.
Figure 5:
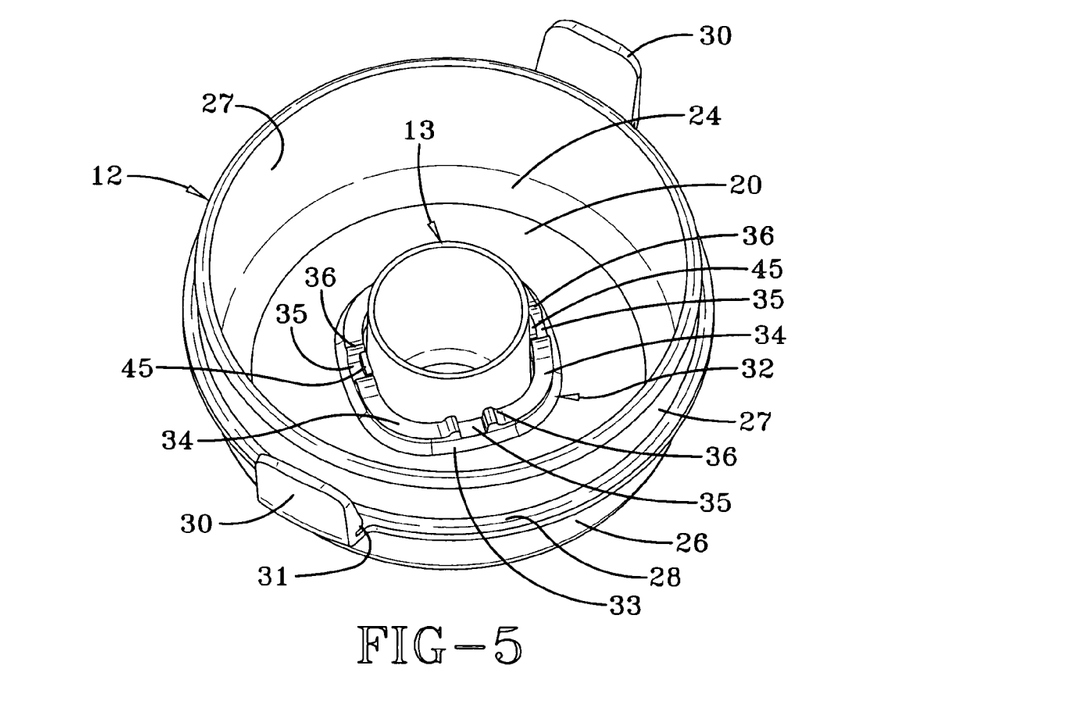
FIG. 5 is a view similar to FIG. 4 but showing the lid and plug components in a locked position.
Figure 6:
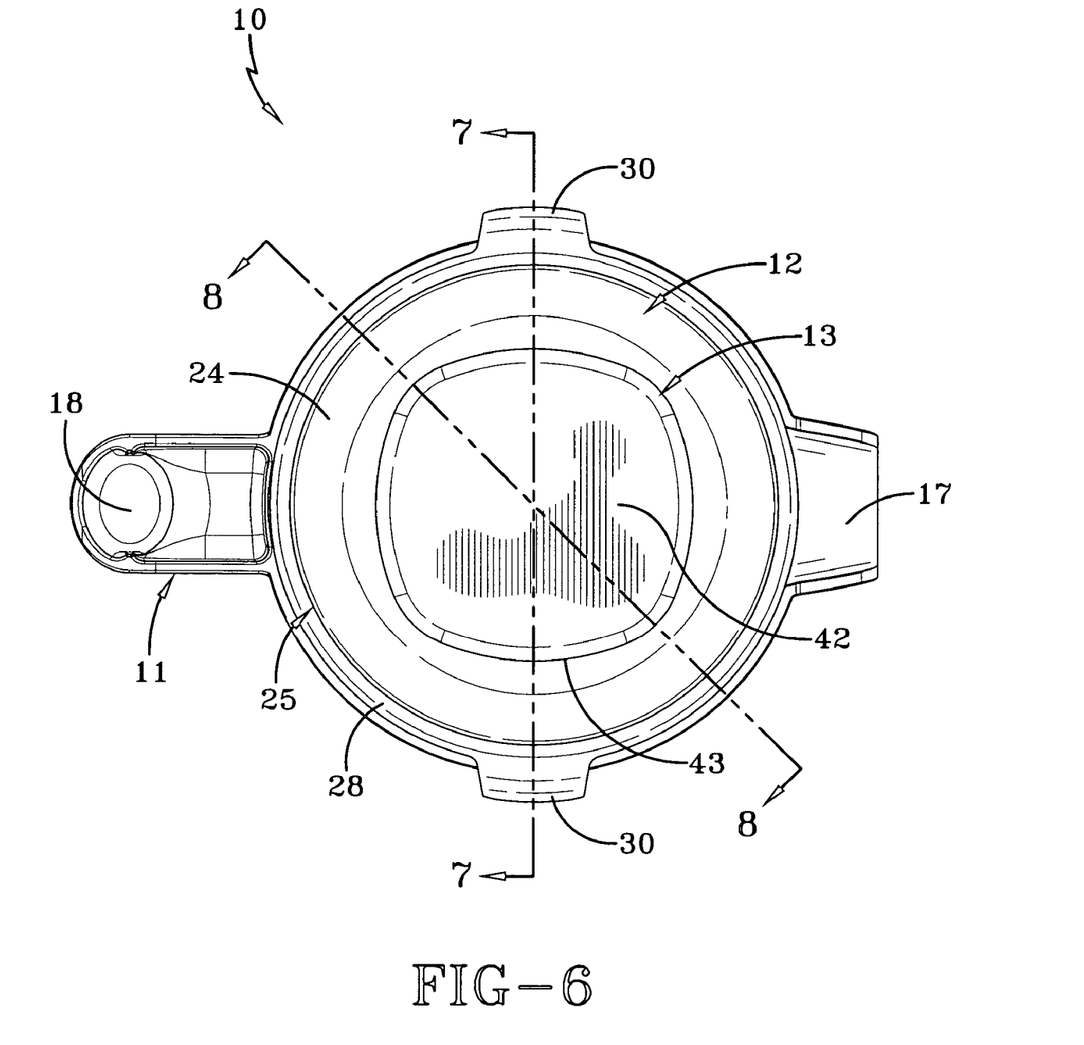
FIG. 6 is a top plan view of the components of FIG. 1 assembled.

As shown in FIGS. 3-5, cover 12 is provided with a locking system which includes a ridge, generally indicated by the numeral 32, formed on the underside of cover top surface 20. Ridge 32 extends downwardly from surface 20 around the perimeter of cover aperture 21. Thus, ridge 32 takes on the generally square configuration of aperture 21 having four sides 33 and somewhat rounded corners 34. A notch 35 is formed in each side 33 of ridge 32, and a rib 36 is positioned on each side of each notch 35. Ribs 36 thus extend downwardly from ridge 32 and effectively increase the depth of each notch 35. This locking system cooperates with plug 13 to lock plug 13 in aperture 21 of cover 12, as now will be described.

Plug 13 is preferably made of a rigid plastic, such as polycarbonate, and is generally mushroom-shaped, having a cap generally indicated by the numeral 40 and a stem generally indicated by the numeral 41. Cap 40 includes an upper surface 42 and a downwardly directed skirt 43 extending from the periphery of upper surface 42. The bottom of skirt 43 is provided with a plurality of notches 44 which, as will hereinafter be described, permit the venting of steam or the like should hot foods be processed in container 11. Stem 41 is cylindrical in configuration and for reasons that will be hereinafter described, the outer diameter of stem 41 should approximate the size of the sides 22 of aperture 21 and sides 33 of ridge 32. Opposed tabs 45 extend from the outer surface of cylindrical stem 41. Ribs 46 are shown positioned axially adjacent to tabs 45, but they serve no other function than assisting in the ease of molding plug 13.

Aperture 21 in cover 12 serves to permit the addition of items to container 11 or to permit manual stirring of the contents of the container 11 after cover 12 has been attached to container 11 in the manner previously described. However, when not needed for those purposes, it is preferable to close aperture 21 with plug 13. To that end, the cylindrical stem 41 is inserted through aperture 21. However, to do so, the tabs 45 must be aligned with either set of opposed rounded corners 23 of aperture 21 because if not so aligned, stem 41 cannot be inserted through aperture 21 as tabs 45 will engage walls 22 of aperture 21. Such alignment is generally shown in FIG. 3, and FIG. 4 shows the orientation of the components once the stem 41 has been inserted through aperture 21 with tabs 45 aligned with one set of opposed corners 34. In this position, the bottom of skirt 43 of plug 13 is engaging cover surface 20 which locates tabs 45 just below cover ridge 32. Then to lock plug 13 in place, it needs to be rotated approximately forty-five degrees, from the FIG. 4 position to the FIG. 5 position. During such rotation, some of the ribs 36 are engaged by tabs 45 and will deflect, due to the resiliency of cover 12, thereby allowing tabs 45 to be received in opposed notches 35. At this FIG. 5 position, plug 13 cannot be pulled out of aperture 21 because of the interference of tabs 45 in notches 35. Moreover, when the contents of container 11 cause pressure to be placed on plug 13, tabs 45 will be driven even harder into notches 35 thereby increasing the latching effect of plug 13. In addition, during preparation of hot food items, the pressure build-up of steam can be vented through the space between stem 41 and corners 34 and between the space between notches 44 and cover surface 20.

In order to remove plug 13 from cover 12, plug 13 must again be rotated so that tabs 45 deflect the ribs 36 adjacent thereto to allow tabs 45 to move out of opposed notches 35 and back to alignment with opposed corners 34 of aperture 21. At this location, plug 13 may be axially lifted out of cover 12.

In view of the foregoing, it should be evident that a container, cover and plug system as described herein accomplishes the objects of the invention and otherwise substantially improves the art.

What is claimed is:

1. In combination, a cover having a generally square opening having sides and corners and a plug to close said opening; the plug including a generally cylindrical stem having opposed tabs extending therefrom; the cover being made of an elastomeric material and having a generally square ridge having sides and corners depending from the periphery of said opening, the diameter of said stem approximately the length of a side of said opening and of said ridge, said ridge including at least one notch with a rib positioned on each side of said notch; the relative dimensions of said stem and said opening being such that at some relative positions between said stem and said opening said stem can pass through said opening such that upon rotation of said plug relative to said cover each of said tabs can pass over a said rib and be received in said notch.

2. The combination of claim 1, said stem and said tabs being sized so that said stem and said tabs can pass through said opening when said tabs are aligned with said corners.

3. The combination of claim 2, the cover having a top surface having said aperture, the plug having a skirt which engages said top surface when said stem has passed through said aperture so that said tabs are positioned below said ridge.

4. In combination, a cover having an opening, a plug to close the opening, and a container having sidewalls and a lip extending from said sidewalls; the plug including a stem having opposed tabs extending therefrom; the cover having at least one handle with a notch therein to engage said lip, the cover being removable from the container by lifting said handle to remove said lip from said notch, the cover being made of an elastomeric material and having a ridge depending from the periphery of the opening, the ridge including at least one notch with a rib positioned on each side of said notch; the relative dimensions of said stem and said opening being such that at some relative positions between said stem and said opening said stem can pass through said opening such that upon rotation of said plug relative to said cover each of said tabs can pass over a said rib and be received in said notch.

5. The combination of claim 4, the cover having a top surface, a skirt extending downwardly from the periphery of said top surface, and a rim on said skirt, said rim resting on said lip.

6. The combination of claim 5 wherein said rim carries said handle.

7. The combination of claim 5 wherein said skirt includes a rib to engage the inside of said sidewalls.

8. In combination, a container and a cover; the container having sidewalls and a lip extending from said sidewalls; the cover being made of an elastomeric material and having at least one handle, said handle having a notch therein to engage said lip of the container; the cover having a top surface and a skirt extending downwardly from the periphery of said top surface, and a rim on said skirt, said rim resting on said lip; the cover being removable from the container by lifting said handle to remove said lip from said notch.

9. The combination of claim 8, the cover having two opposed handles.

10. The combination of claim 8 wherein said rim carries said handle.

11. The combination of claim 8 wherein said skirt includes a rib to engage the inside of said sidewalls.

12. The combination of claim 8 further in combination with a plug, the cover having an opening therein closed by the plug, the relative dimensions of the plug and said opening being such that at some relative positions, the plug can close said opening.

13. In combination, a container, a cover, and a plug; the container having sidewalls and a lip extending from said sidewalls; the cover being made of an elastomeric material and having at least one handle, said handle having a notch therein to engage said lip of the container; the cover being removable from the container by lifting said handle to remove said lip from said notch; the cover having an opening therein closed by the plug; the plug having a generally cylindrical stem and the cover having a generally square ridge surrounding said opening and having sides and corners, the diameter of said stem approximating the length of a side of said ridge such that at some relative positions, the plug can close said opening.

14. The combination of claim 13, said stem having diametrically opposed tabs extending therefrom, said stem being capable of passing through said opening only when said tabs are aligned with said corners.

15. The combination of claim 14, the cover having a top surface having said aperture, the plug having a skirt which engages said top surface when said stem has passed through said aperture so that said tabs are positioned below said ridge.

16. The combination of claim 15 wherein said ridge includes a notch on each side, and a rib positioned on each side of each said notch, opposed notches receiving said tabs when said tabs are aligned with said sides.

17. A container system comprising a pitcher having an upper lip; an elastomeric cover for said pitcher, said cover having at least one handle, a notch in said handle to engage said lip of said pitcher, an opening in said cover, a ridge depending from the periphery of said opening, said ridge including at least one notch and a rib positioned on each side of said notch; and a plug to close said opening in said cover, said plug including a stem having opposed tabs extending therefrom, the relative dimensions of said stem and said opening being such that at some relative positions between said stem and said opening said stem can pass through said opening such that upon rotation of said plug relative to said cover each of said tabs can pass over a said rib and be received in said notch in said ridge.

18. A container system of claim 17, said stem being generally cylindrical and said opening and said ridge being generally square having sides and corners, the diameter of said stem approximating the length of a side of said opening and of said ridge.

19. A container system of claim 18, said stem and said tabs being sized so that said stem and said tabs can pass through said opening when said tabs are aligned with said corners.

20. A container system of claim 19, the cover having a top surface having said aperture, said plug having a skirt which engages said top surface when said stem has passed through said aperture so that said tabs are positioned below said ridge.

21. A container system of claim 17, said cover having a top surface and a skirt extending downwardly from the periphery of said top surface, and a rim on said skirt, said rim resting on said lip.

22. A container system of claim 21 wherein said rim carries said handle.

23. A container system of claim 21 wherein said skirt includes a rib to engage the inside of said sidewalls.

* * * * *